United States Patent

Hume

[15] 3,655,057
[45] Apr. 11, 1972

[54] TANK STRUCTURE

[72] Inventor: George Dennis Hume, 6741 Loyola Drive, Huntington Beach, Calif. 92647

[22] Filed: Feb. 20, 1970

[21] Appl. No.: 13,082

[52] U.S. Cl. ............................................210/288, 210/291
[51] Int. Cl. ......................................................B01d 23/10
[58] Field of Search..................210/277, 279, 287, 288, 289

[56] References Cited

UNITED STATES PATENTS

| 656,043 | 8/1900 | Paterson | 210/279 X |
|---|---|---|---|
| 3,276,585 | 10/1966 | Kalinske | 210/279 X |
| 1,942,807 | 1/1934 | Dotterweich | 210/279 X |

*Primary Examiner*—Samih N. Zaharna
*Attorney*—William C. Babcock

[57] ABSTRACT

A vertically disposed high pressure tank having upper and lower convex ends, and a flat horizontal partition within the tank adjacent the lower end thereof that cooperates with the tank to define an upper and a lower compartment. The partition serves as a base to support a bed of media such as zeolite, sand, filtering material or the like within the confines of the first compartment.

First means are provided to discharge a liquid at a first desired pressure into the upper portion of the upper compartment and to remove the liquid from the confines of the tank after it has been treated by percolating downwardly through the bed to a position adjacent said partition. Second means are also provided for concurrently discharging said liquid into the lower compartment at said first pressure.

Said lower compartment is maintained in a flooded condition during the discharge of liquid into the upper compartment, with the result that liquid pressure both above and below the partition is substantially equal, and the partition may be of relatively light structure. Due to this equalization of pressures, above and below the partition, no heavy reinforcing means for the partition are required in the lower compartment.

5 Claims, 6 Drawing Figures

PATENTED APR 11 1972 3,655,057

INVENTOR.
GEORGE DENNIS HUME
BY
William G. Babcock
ATTORNEY

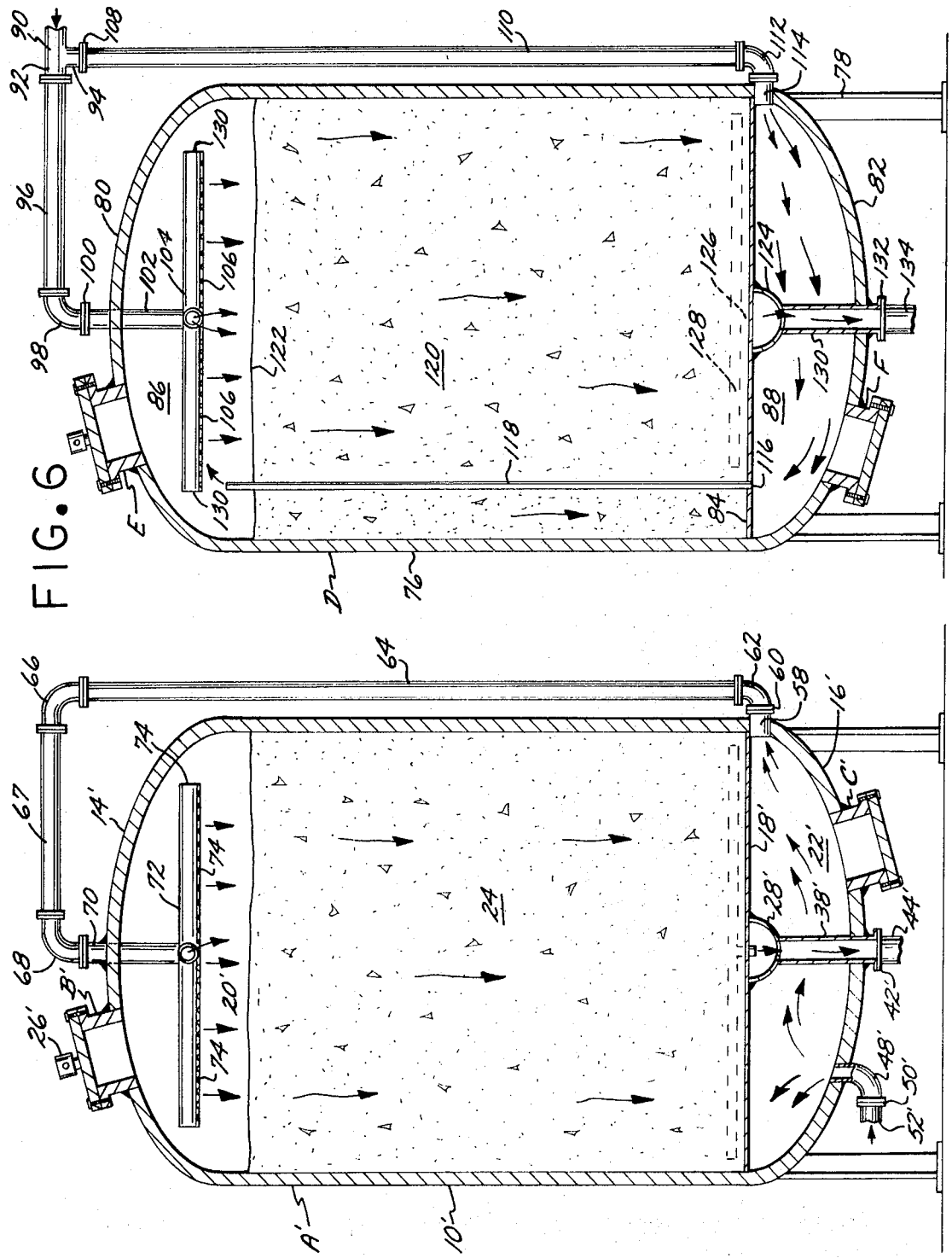

TANK STRUCTURE

BACKGROUND OF THE INVENTION

1. Field of the Invention

Tank structure.

2. Description of the Prior Art

For many years vertically positioned tanks having upper and lower convex ends and an internal flat horizontal partition that divides the tank into upper and lower compartments have been used in the treating of liquids. The partition serves as a base to support a bed of media such as zeolite, sand, filtering material or the like within the confines of the tank.

The liquid to be treated is discharged at a substantial pressure into the upper portion of the upper compartment and is withdrawn from the tank after it has percolated downwardly through the tank to a position adjacent said partition. The lower compartment in a tank of the structure above described serves no useful purpose, and in the past has been either filled with concrete or heavy structural members to reinforce the partition against the substantial downward force exerted thereon by the high pressure liquid in the first compartment.

Due to the substantial differential in pressure that exists between the upper and lower surfaces of the partition, the partition in past prior art devices of this nature had to be of heavy structure and reinforced as above described. Reinforcing of compartmented tanks by heavy structural members as has been done in the past is undesirable, as it needlessly increases the weight and the cost of the tank structure. Also, the prior art compartmented tanks due to the heavy weight thereof required massive equipment to handle the tanks in being moved from the location of manufacture to the site where they are to be installed.

The primary purposed in devicing the present invention is to overcome the operational disadvantages of prior art compartmented tanks, both as to structure and the cost of manufacture, as well as the high freight charges in shipping the tanks.

SUMMARY OF THE INVENTION

A vertically positioned high pressure tank having a flat horizontal internal partition that divides the tank into upper and lower compartments, with the upper compartment serving to hold a bed of media such as zeolite, sand, filtering material or the like. First means are provided for introducing the liquid to be treated into the upper portion of the upper compartment, and for withdrawing the liquid after the latter has percolated downwardly through the bed to a position adjacent the partition.

Second means are provided for maintaining the second compartment in a flooded conditition with liquid at substantially the same pressure as said liquid in said first compartment. Due to the substantial equal and opposite liquid pressures on both sides of said partition, the partition may be of relatively light structure, and the second compartment need not be filled with concrete or heavy structural reinforcing members.

A major object of the present invention is to provide a media holding tank that eliminates the necessity of concrete or reinforcing material in the lower compartment thereof by filling said lower compartment with a liquid that is at substantially the same pressure as the liquid in the upper compartment of the tank, and thus eliminate a major disadvantage that is inherent to prior tanks of this general structure.

Another object of the invention is to provide a compartmented media holding tank that is substantially lighter in weight than previously available tanks, and may accordingly be moved and shipped at a lesser expense.

A further object of the invention is to furnish a compartmented media holding tank that requires less material in the construction thereof than previously available tanks, is simpler to fabricate, and hence may be sold at a lower price than tanks that embody the prior art structures previously described.

BRIEF DESCRIPTION OF THE DRAWINGS

FIG. 5 is a longitudinal cross-sectional view of a second form of tank structure; and FIG. 6 is a longitudinal cross-sectional view of a third form of tank structure.

Figure 2:
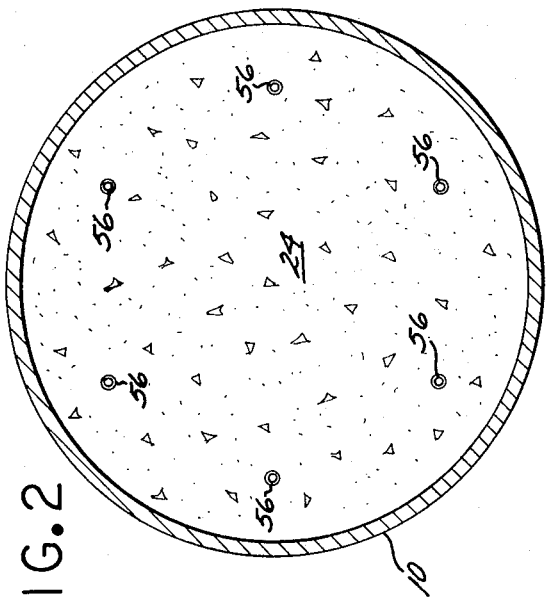
FIG. 2 is a transverse cross - sectional view of the device shown in FIG. 1 taken on the line 2—2 thereof.

The first form A of the tank structure illustrated in Figure 1-4 includes a cylindrical shell 10 that is supported in a vertical position by a number of circumferentially spaced legs 12 or other conventional means such as welding or the like. A lower downwardly convex end piece 16 is likewise secured to the lower end of shell 10.

A flat horizontal partition 18 is affixed to the interior of shell 10 adjacent to lower end piece 16 by welding or the like. Partition 18 cooperates with shell 10 and end piece 14 and 16 to define upper and lower compartments 20 and 22. The partition 18 serves as a base to support a bed of media 24 such as zeolite, sand, filtering material or the like, within the confines of the upper compartment 20.

A first flanged manhole assembly B of conventional design is supported by upper end piece 14, to permit access to the interior of the tank structure A. The assembly B includes a pressure relief valve 26 to prevent the pressure in the tank A rising to a dangerously high level.

Figure 1:
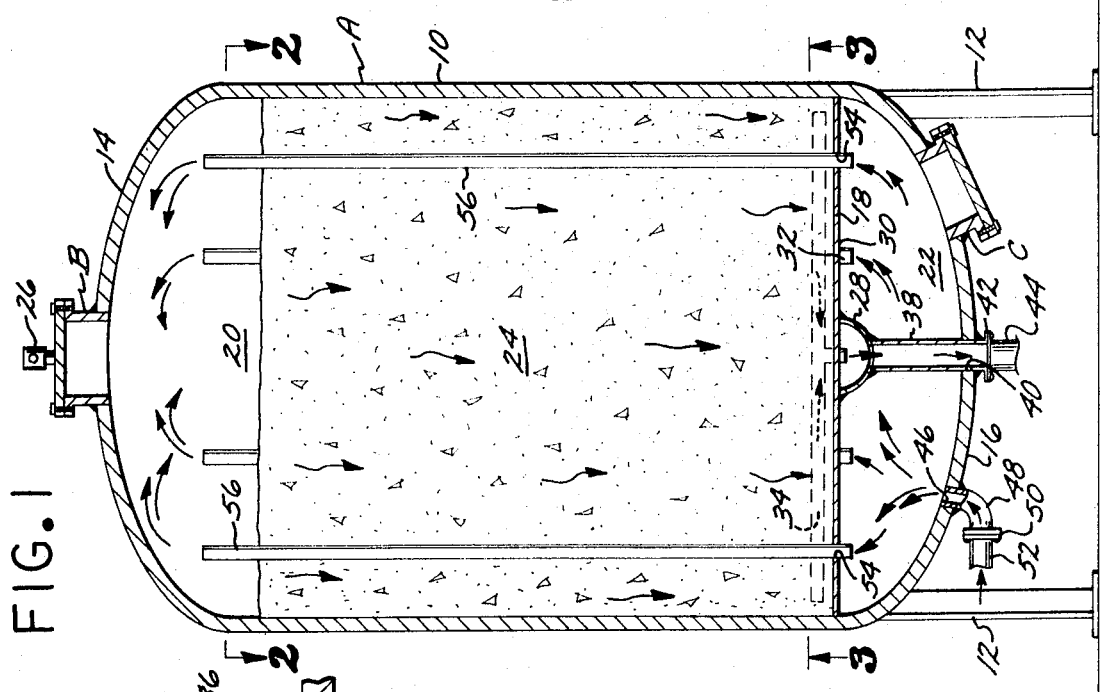
FIG. 1 is a longitudinal cross-sectional view of a first form of the tank structure.
Figure 4:
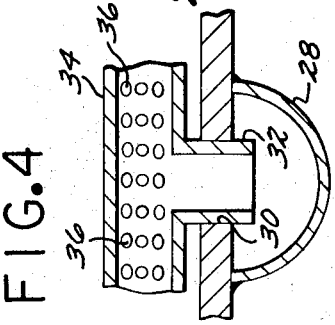
FIG. 4 is a fragmentary vertical cross-sectional view of the tank structure taken on the line 4—4 of FIG. 3.

A second manhole assembly C is secured to the downwardly convex end piece 16 as shown in Figure 1, which assembly serves to permit foreign material that may have accumulated in the lower compartment 22 to be cleaned therefrom. A hollow member 28 of semicircular transverse cross section having closed ends is welded or otherwise secured to the lower surface of the partition 18. The semicircular member 28 extends diametrically across the partition 18 and is in communication with a number of spaced openings 30 formed therein. Each of the spaced openings 30 has a vertically positioned tubular nipple 32 extending thereinto, and secured to the partition 18 by conventional means (not shown).

Figure 3:
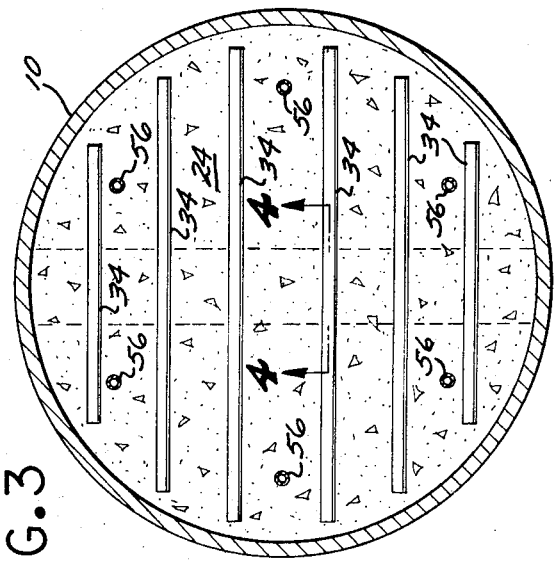
FIG. 3 is a second transverse cross-sectional view of the device shown in FIG. 1 taken on the line 3—3 thereof.

Each of the nipples 32 supports an elongate horizontal tubular liquid drain member 34 on the upper end thereof, with the interiors of the nipples and drain members being in communication with one another. Each of the drain members 34 has a number of circumferentially, and longitudinally spaced openings 36 therein, as may best be seen in Figure 4. The drain members 34 are adjacently disposed to the upper surface of the partition 18. The drain members 34 as illustrated in Figure 3 of the drawing, are parallel to one another.

The member 28 at substantially the center portion thereof is connected to a downwardly extending tubular liquid drain conduit 38, which conduit extends through an opening 40 formed in the lower convex end piece 16. The drain conduit is sealing connected to the portion of the lower convex end piece 16, adjacent opening 40, by welding (not shown) or the like. Drain conduit 38 terminates on the lower end thereof in a flange 42 or other suitable connecting means, that permit the drain conduit to be secured to a liquid drain line 44.

A liquid inlet opening 46 is formed in the lower end piece 16 as may best be seen in Figure 1 that is in communication with a tubular elbow 48 that has a flange 50 secured to the free end thereof. The flange 50 permits the tubular elbow 48 to be connected to a flanged conduit 52 that extends to a source of liquid under pressure that is to be treated by downward passage through the bed of media 24.

A number of circumferentially spaced openings 54 are formed in the partition 18 and are in communication with vertically positioned tubular members 56 that extend upwardly through the bed of media 24 to terminate at positions thereabove.

The use and operation of the first form A of the tank structure is extremely simple. The water to be treated is discharged through the conduit 52 and elbow 48 into the confines of the lower compartment 22. After the water has filled the lower compartment 22, the water discharges upwardly through the tubular members 56 to discharge into the upper compartment 20. The water fills the upper compartment 20 above the bed of media 24, and the percolates down through the media. As the liquid flows downwardly through the bed of media 24, it ultimately reaches the drain members 34, whereupon it flows through the openings 36 therein to discharge into the semicircular member 28 and flow therefrom through the drain conduit 38 into the liquid drain line 44 that is connected to stroage facilities (not shown) or to equipment (not shown) that will utilize the treated water.

The water to be treated is discharged into the first form of tank structure A faster than it will percolate downwardly through the bed of media 24, and as a result the water in upper compartment 20 and lower compartment 22 is at substantially the same pressure, and the partition 18 is subjected to a minimum of stress as a result of the pressure at which the first form of the device operates. The partition 18 need by only sufficiently strong as to support the weight of the bed of media 24 when the bed is saturated with the water or other liquid being treated.

A second form of the tank structure A' is shown in Figure 5. Elements of the second form A' that are common to the first form A are identified in the drawing by the same numerals used in connection with the first form, but with primes being added thereto. The second form of tank structure A' includes a liquid outlet 58 that is in communication with the lower compartment 22'. The liquid outlet 58 by flanges 60 or other conventional means is connected to a tubular elbow 62 that is in communication with an upwardly extending conduit 64. Conduit 64 is connected by an elbow 66 to a second conduit 67, which in turn is connected to an elbow 68 that is in communication with a tubular member 70 that extends downwardly through the upper convex end piece 14' into the upper compartment 20'. The tubular member 70 develops on the lower end thereof into a tubular cross 72 that has a number of perforations 74 formed therein through which water discharges to percolate downwardly through the bed of media 24'. The tubular cross 72 has closed outer ends 74.

The use and operation of the second form of tank structure A' is simple. Liquid is discharged through the conduit 52 and tubular elbow 48' into the lower compartment 22' to fill the same, with liquid then flowing upwardly through the liquid outlet 58, elbow 62, conduit 64, elbow 66, conduit 67, elbow 68, tubular member 70 to discharge into the upper compartment 20' through the perforation 74. The liquid to be treated is discharged into the lower compartment 22' and upper compartment 20' at a rate greater than that at which it will percolate downwardly through the bed of media 24', and as a result both the upper and lower compartments are flooded with liquid at a substantially the same pressure. Due to the equilization of the liquid pressure in the upper compartment 20' and lower compartment 22' the partition 18' is subjected to a minimum of deforming forces, and the partition need be only sufficiently strong as to support the weight of the bed of media 24', when the latter is saturated with liquid being treated, as well as the weight of the liquid disposed in the upper compartment 20' and standing above the bed 24'.

A third form D of the tank structure is shown in Figure 6 which includes a cylindrical shell 76 that is supported in a vertical position by a number of legs 78 or other suitable supporting means. The third form D of the tank structure includes an upper convex end piece 80 and lower convex end piece 82. The upper convex end piece 80 has a first manhole assembly E assocaited therewith as can best be seen in Figure 6. Likewise, the lower convex end piece 82 is provided with a second manhole assembly F as shown in Figure 6. A horizontal partition 84 is secured to the lower interior surface of the shell 76 by welding or other suitable fastening means to divide the third form of tank structure D into an upper compartment 86 and lower compartment 88.

Water or other liquid to be treated is discharged from a pressurized source (not shown) through a conduit (not shown) to a tubular tee 90, illustrated in Figure 6 that has a first leg 92 and second leg 94. The first leg 92 is connected to a conduit 96 that terminates in a down-turned elbow 98 that is connected by flange means 100 to a downwardly extending tubular member 102 that passes through the upper end piece 80 into the confines of the upper compartment 86. The tubular member 102 is connected to a tubular cross 104 that has a number of longitudinally spaced perforation 106 therein.

The tee 90 has a second leg 94 thereof connected by flange means 108 to a downwardly extending conduit 110 that is connected to a flanged elbow 112. The elbow 112 is connected to a liquid inlet 114 that is in communication with the lower compartment 88. Partition 84 has a number of circumferentially spaced openings 116 formed therein that are in communication with tubular members 118 that extend upwardly through a bed of media 120, for treated the water or liquid discharged into the third form of tank structure, and to a position above the upper surface 122 of the bed.

The use and operation of the third form of tank structure D is extremely simple. The liquid to be treated is discharged into the tee 90 where a portion of it flow downwardly through the conduit 110, elbow 112, and liquid inlet 114 to fill the lower compartment 88. A portion of the liquid to be treated also flows from tee 90 through the first leg 92 thereof to conduit 96, tubular member 102, and tubular cross 104 to discharge through the perforations 106 into the confines of the upper compartment 86. The fluid so discharged into the upper compartment 86 percolates downwardly through the bed of media 120.

Liquid in the lower compartment 88 may also flow upwardly through the tubular members 118 into the upper compartment 86 and then flow downwardly through the bed 12c in the same manner as liquid discharged from the perforations 106. A hollow semicircular tubular member 124 having closed ends is welded or otherwise secured to the lower surface of the partition 84, and is in communication with a number of nipples 126 that extend upwardly from openings (not shown) in the partition to support a number of horizontal tubular drain members 128 that are perforated and are of the same structure as the drain members 34 previously described. The drain members 34, 34' and 128 all have closed outer ends (not shown). The tubular cross 104 also has closed outer ends 130. Semicircular member 124 is in communication with a downwardly extending member 130 that passes through the lower convex end piece 82 and sealing engages the same. The tubular member 130 exteriorly of the end piece 82 is provided with flanges 132 that serve to connect the tubular member 130 to a drain line 134 that extends to a storage area (not shown) for the treated water or to equipment (not shown) in which the treated water will be utilized.

The third form of tank structure D is subjected to a number of modifications such a blanking off the second leg 94 of tee 90 and the liquid inlet 114. The conduit 110 would be eliminated. The liquid to be treated will now discharge through the perforations 106 into the confines of the upper compartment 86, and flow downwardly through the tubular members 118 to fill the lower compartment 88. When both compartments are filled with the liquid to be treated, substantially equal pressures exist on opposite sides of the partition 84, and the partition is not subjected to any deforming force of appreciable magnitude as a result thereof. The liquid to be treated after compartments 86 and 88 have been filled therewith, percolates downwardly through the bed of media 120, and flows through the perforations in the drain members 128 into the semicircular member 124, and from this member to the drain line 134. The drain line leads to a storage area for the treated water (not shown), or to equipment (not shown) that uses such treated water.

Another modification of the third form D of the tank structure, is to provide a solid partition 84 that has no openings 116 therein, and in which the tubular members 118 are eliminated. Equalization of water or liquid to be treated in this modified form of the device is by liquid flowing into the upper compartment 86 through the perforations 106 and into the lower compartment 88 through the liquid inlet member 114. Here again, the liquid pressure in both the upper compartment 86 and lower compartment 88 is equalized, and the partition 88 has no deforming hydraulic pressure applied thereto. The partition in both the modified forms of the third form D of the tank structure need be only strong enough to support the bed of media 120 when it is saturated with the liquid to be treated, and the column of liquid in the upper compartment 86 above the upper surface 122 of the bed of media.

The third form of the tank structure D and the two modifications thereof above described operate in substantially the same manner and produce substantially the same result, with the differences being in the manner that equalization of liquid pressure between the upper compartment 86 and lower compartment 88 is achieved.

The structure of the various forms of the tank structure have previously been described in detail, as well as the manner in which the same operates, and this information need not again be repeated.

I claim:

1. In a vertically disposed liquid treatment tank structure having a cylindrical shell, upper and lower convex end pieces secured to said shell, and a horizontal partition secured to the interior of said shell adjacent said lower end piece that divides the interior of said tank into upper and lower compartments, said partition serving as a base to support a bed of liquid treating media in said upper compartment, the improvement for treating liquid under pressure by percolating the liquid downwardly through said bed without subjecting said partition to any substantial downward hydraulic force as a result of said pressure on said liquid, said improvement comprising:
   a. first means that tend to discharge the liquid to be treated into said lower compartment at a rate faster than the rate at which said liquid will percolate downwardly through said bed by gravity;
   b. second means for conveying liquid from said lower compartment to a position above said bed in said upper compartment, with said liquid filling said lower compartment and the portion of said upper compartment not occupied by said bed, and said liquid exerting substantially equal and opposite force on said partition that do not tend to deform said partition; and
   c. third means for draining liquid that has been treated by percolating downwardly through said bed in said upper compartment to a position exteriorly of said tank structure, said third means including:
      1. a plurality of aligned tubular nipples that extend upwardly in said upper compartment from a plurality of spaced openings formed in said partition;
      2. a plurality of horizontal perforated liquid drain members supported by said nipples and in communication with the interiors thereof;
      3. a semicylindrical hollow member having closed ends, which semicylindrical member is secured to the lower surface of said partition in communication with said openings; and
      4. a liquid drain line in communication with the interior of said semi-cylindrical member, and which drain line conducts liquid that has percolated downwardly through said bed to a position exteriorly of said tank structure.

2. A tank structure as defined in claim 1 in which said second means is a plurality of circumferentially spaced, longitudinally extending tubular members that are disposed in said upper compartment, with the upper ends of said tubular members disposed above the upper surfaces of said bed, and the lower ends of said tubular members in communication with a plurality of openings defined in said partition.

3. A liquid treatment tank as defined in claim 1 in which said second means is a conduit positioned exteriorly of said tank that is connected on a first end to said lower end piece to communicate with said lower compartment, and said conduit having a second end portion that extends through said upper end piece to communicate with said upper compartment above said bed.

4. A liquid treatment tank as defined in claim 3 which in addition includes:
   d. tubular means in said upper compartment connected to said second conduit end portion for distributing the water to be treated over the upper surface of said bed.

5. A liquid treatment tank as defined in claim 4 in which said tubular means is a plurality of perforated tubular legs that radiate outwardly from said lower extremity of said second end portion of said conduit.

* * * * *